US011255388B2

(12) United States Patent
Aono et al.

(10) Patent No.: US 11,255,388 B2
(45) Date of Patent: Feb. 22, 2022

(54) CENTRIFUGAL CLUTCH

(71) Applicant: Kabushiki Kaisha F.C.C., Hamamatsu (JP)

(72) Inventors: Kaoru Aono, Shizuoka (JP); Yuta Yokomichi, Shizuoka (JP); Yuta Kine, Shizuoka (JP); Makoto Kataoka, Shizuoka (JP)

(73) Assignee: Kabushiki Kaisha F.C.C., Shizuoka (JP)

(*) Notice: Subject to any disclaimer, the term of this patent is extended or adjusted under 35 U.S.C. 154(b) by 0 days.

(21) Appl. No.: 17/050,700

(22) PCT Filed: May 24, 2019

(86) PCT No.: PCT/JP2019/020577
§ 371 (c)(1),
(2) Date: Oct. 26, 2020

(87) PCT Pub. No.: WO2019/230574
PCT Pub. Date: Dec. 5, 2019

(65) Prior Publication Data
US 2021/0079961 A1 Mar. 18, 2021

(30) Foreign Application Priority Data
May 28, 2018 (JP) .............................. JP2018-101286

(51) Int. Cl.
*F16D 43/18* (2006.01)
*F16D 43/14* (2006.01)
(52) U.S. Cl.
CPC ........ *F16D 43/18* (2013.01); *F16D 2043/145* (2013.01)
(58) Field of Classification Search
CPC ............................ F16D 43/18; F16D 2043/145
See application file for complete search history.

(56) References Cited

U.S. PATENT DOCUMENTS 2,375,909 A * 5/1945 Fawick .................. F16D 43/18
                                                    192/105 BA
4,294,342 A    10/1981 St. John
(Continued)

FOREIGN PATENT DOCUMENTS

DE              747012 C       9/1944
JP          S57-107440 A       7/1982
(Continued)

OTHER PUBLICATIONS

International Search Report (ISR) dated Aug. 6, 2019 filed in PCT/JP2019/020577.
(Continued)

*Primary Examiner* — David R Morris
(74) *Attorney, Agent, or Firm* — Rankin, Hill & Clark LLP

(57) ABSTRACT

Provided is a centrifugal clutch configured so that tilt of a clutch weight can be more effectively reduced to reduce occurrence of uneven wear of the clutch weight and a clutch shoe and smoothly swing the clutch weight. A centrifugal clutch 200 includes clutch weights 230 and plate-side cam bodies 218 on a drive plate 210 to be rotatably driven by drive force of an engine. The clutch weight 230 turnably displaces to a clutch outer 240 side, and includes a weight-side cam body 238 configured to climb on the plate-side cam body 218. In the clutch weight 230, each of a center portion CCP in a cam contact area CE between the plate-side cam body 218 and the weight-side cam body 238, the positions FP1, FP2 of action of force F1, F2 of a coupling spring 235, and a center portion SCP of a clutch shoe 236 in a thickness direction thereof is coincident with a barycentric position WCP of the clutch weight 230.

6 Claims, 7 Drawing Sheets

(56) References Cited

U.S. PATENT DOCUMENTS

| | | | | |
|---|---|---|---|---|
| 8,157,074 B2* | 4/2012 | Harada | ............... | F16D 43/18 |
| | | | | 192/105 CD |
| 8,951,153 B2* | 2/2015 | Ishida | ................ | F16D 43/18 |
| | | | | 474/94 |
| 10,539,197 B2* | 1/2020 | Aono | ................. | F16D 43/18 |
| 10,626,932 B2* | 4/2020 | Yokomichi | ............ | F16D 43/22 |
| 10,927,905 B2* | 2/2021 | Aono | ................. | F16D 43/18 |
| 2004/0055851 A1* | 3/2004 | Ishizaka | .............. | F16D 43/18 |
| | | | | 192/105 CD |
| 2007/0144859 A1 | 6/2007 | Sotani et al. | | |
| 2009/0250306 A1 | 10/2009 | Harada | | |
| 2012/0100945 A1 | 4/2012 | Ishida et al. | | |
| 2019/0072140 A1* | 3/2019 | Aono | ................. | F16D 43/18 |
| 2019/0186558 A1* | 6/2019 | Yokomichi | ............ | F16D 43/18 |
| 2019/0338813 A1 | 11/2019 | Aono et al. | | |
| 2020/0340540 A1* | 10/2020 | Aono | ................. | F16H 55/56 |
| 2021/0108687 A1* | 4/2021 | Aono | ................. | F16D 43/211 |
| 2021/0115986 A1* | 4/2021 | Aono | ................. | F16D 43/18 |

FOREIGN PATENT DOCUMENTS

| | | | |
|---|---|---|---|
| JP | 2007-270971 A | 10/2007 |
| JP | 2010-223157 A | 10/2010 |
| JP | 2011-2044 A | 1/2011 |
| JP | 6293848 B1 | 3/2018 |

OTHER PUBLICATIONS

Extended European Search Report (EESR) dated Dec. 23, 2021 for corresponding European Patent Application No. 19811740.0.

* cited by examiner

CENTRIFUGAL CLUTCH

TECHNICAL FIELD

The present invention relates to a centrifugal clutch configured to block transmission of rotary drive force to a driven side until an engine reaches a predetermined number of rotations and transmit the rotary drive force to the driven side when the engine reaches the predetermined number of rotations.

BACKGROUND ART

Typically, in, e.g., a motorcycle or a string trimmer, a centrifugal clutch configured to transmit rotary drive force to a driven side when an engine reaches a predetermined number of rotations has been used. For example, a centrifugal clutch disclosed in Patent Literature 1 below includes a drive plate to be rotatably driven by rotary drive force from an engine and a clutch weight. The clutch weight is rotatably supported on the drive plate, and by rotary drive of the drive plate, is opened outwardly in a radial direction and is pressed against a clutch outer. In this case, the centrifugal clutch is configured such that the position of action of force of a clutch spring overlaps with the area of contact between a protruding body provided on the drive plate and a driven portion formed at the clutch weight in a thickness direction. With this configuration, tilt of the clutch weight upon turning is reduced.

CITATION LIST

Patent Literature

PATENT LITERATURE 1: Japanese Patent No. 6293848

However, in the centrifugal clutch described in Patent Literature 1 above, a problem has been found, in which even when the centrifugal clutch is formed such that the position of action of the force of the clutch spring overlaps with the inside of the area of contact between the protruding body and the driven portion in the thickness direction, tilt of the clutch weight upon turning fails to be prevented in some cases. Specifically, it has been found that in a case where the position of action of the force of the clutch spring is arranged on an end side in the area of contact between the protruding body and the driven portion in the thickness direction, the clutch weight tilts in some cases.

The present invention has been made for coping with the above-described problem, and an object of the present invention is to provide the following centrifugal clutch. This centrifugal clutch can more effectively reduce tilt of a clutch weight to reduce occurrence of uneven wear of the clutch weight and a clutch shoe and smoothly swing the clutch weight.

SUMMARY OF INVENTION

In order to achieve the above-described object, a feature of the present invention is a centrifugal clutch which includes: a drive plate to be rotatably driven together with a driven pulley in response to drive force of an engine; a clutch outer having, outside the drive plate, a cylindrical surface provided concentrically with the drive plate; multiple clutch weights having clutch shoes formed to extend along a circumferential direction of the drive plate and facing the cylindrical surface of the clutch outer, one end side of each clutch weight in the circumferential direction being turnably attached onto the drive plate through a swing support pin and a pin slide hole and the other end side displacing toward a cylindrical surface side of the clutch outer; a plate-side cam body having, on the drive plate, a surface extending in a rotary drive axis direction of the drive plate; a weight-side cam body provided at the each clutch weight and configured to slide and climb on the plate-side cam body upon displacement of the other end side of the each clutch weight; and a coupling spring attached to the each clutch weight and causing force in a direction in which the each clutch weight separates from the clutch outer to act on the other end side of the each clutch weight. At least one of a center portion of a portion, at which the plate-side cam body and the weight-side cam body contact each other, in a thickness direction or a position of action of force of the coupling spring in a thickness direction of the each clutch weight is formed coincident with a barycentric position of the each clutch weight.

According to the feature of the present invention configured as described above, in the centrifugal clutch, at least one of the center portion of the portion, at which the plate-side cam body and the weight-side cam body contact each other, in the thickness direction or the position of action of the force of the coupling spring in the thickness direction of the clutch weight is formed coincident with the barycentric position of the clutch weight. Thus, in the centrifugal clutch according to the present invention, tilt of the clutch weight can be more effectively reduced by action of the force of the coupling spring on the barycentric position of the turning clutch weight and/or turning of the plate-side cam body and the weight-side cam body in contact with each other at the same position as the barycentric position of the clutch weight in the thickness direction. Thus, in the centrifugal clutch according to the present invention, occurrence of uneven wear of the clutch weight and the clutch shoe can be reduced, and the clutch weight can be smoothly swung.

Further, another feature of the present invention is the centrifugal clutch, in which the position of action of the force of the coupling spring in the thickness direction of the each clutch weight is formed at a position within a cam contact area between one end portion and the other end portion of the portion at which the plate-side cam body and the weight-side cam body contact each other in the thickness direction of the each clutch weight.

According to another feature of the present invention configured as described above, in the centrifugal clutch, the position of action of the force of the coupling spring is formed at the position within the cam contact area between one end portion and the other end portion of the portion at which the plate-side cam body and the weight-side cam body contact each other in the thickness direction of the clutch weight. Thus, the position of action of the force of the coupling spring is in the vicinity of the barycentric position of the clutch weight.

Further, still another feature of the present invention is the centrifugal clutch, in which each of the center portion of the portion, at which the plate-side cam body and the weight-side cam body contact each other, in the thickness direction and the position of action of the force of the coupling spring in the thickness direction of the each clutch weight is formed coincident with the barycentric position of the each clutch weight.

According to still another feature of the present invention configured as described above, in the centrifugal clutch, each of the center portion of the portion, at which the plate-side cam body and the weight-side cam body contact each other, in the thickness direction and the position of action of the force of the coupling spring is formed coincident with the barycentric position of the clutch weight. Thus, tilt of the clutch weight can be more effectively reduced.

Further, still another feature of the present invention is the centrifugal clutch, in which a center portion of the clutch shoe in a thickness direction thereof is formed coincident with the barycentric position of the each clutch weight.

According to still another feature of the present invention configured as described above, in the centrifugal clutch, the center portion of the clutch shoe in the thickness direction thereof is formed coincident with the barycentric position of the clutch weight. Thus, tilt of the clutch weight can be more effectively reduced.

Moreover, still another feature of the present invention is the centrifugal clutch further includes: a damper provided on the drive plate to face the each clutch weight and including an elastic body; and a damper groove formed in a groove shape at the each clutch weight, extending along a turning displacement direction in which the each clutch weight approaches or separates from the clutch outer, and configured such that the damper is fitted in the damper groove with the damper being slidably sandwiched by the damper groove. A center portion of a portion, at which the damper and the damper groove contact each other, in the thickness direction is formed coincident with the barycentric position of the each clutch weight.

According to still another feature of the present invention configured as described above, in the centrifugal clutch, the center portion of the portion, at which the damper and the damper groove contact each other, in the thickness direction is formed coincident with the barycentric position of the clutch weight. Thus, tilt of the clutch weight can be more effectively reduced.

Further, still another feature of the present invention is the centrifugal clutch, in which the swing support pin is provided at one of the drive plate or the clutch weight, and is formed to extend toward the other one of the drive plate or the clutch weight, and the pin slide hole is provided at the other one of the drive plate or the clutch weight and is formed in a long hole shape allowing backward displacement of the one end side of the each clutch weight in a rotary drive direction of the drive plate, and the swing support pin is slidably displaceably fitted in the pin slide hole.

According to still another feature of the present invention configured as described above, in the centrifugal clutch, the pin slide hole in which the swing support pin slides is formed in the long hole shape allowing backward displacement in the rotary drive direction of the drive plate. Thus, even in a case where the clutch weight relatively displaces to a rear side in the rotary drive direction of the drive plate, tilt of the clutch weight is reduced so that uneven wear of the clutch shoe can be reduced and the clutch weight can be smoothly swung. Moreover, in the centrifugal clutch, even in a case where the pin slide hole is formed in the long hole shape and a relatively-great clearance is formed between the pin slide hole and the swing support pin, tilt of the clutch weight can be effectively reduced.

Note that the long hole in the above-described aspect of the invention is a through-hole or a blind hole extending long and thin as a whole, and a length in one direction is longer than that in a width direction perpendicular to the one direction.

DESCRIPTION OF EMBODIMENTS

Figure 1:
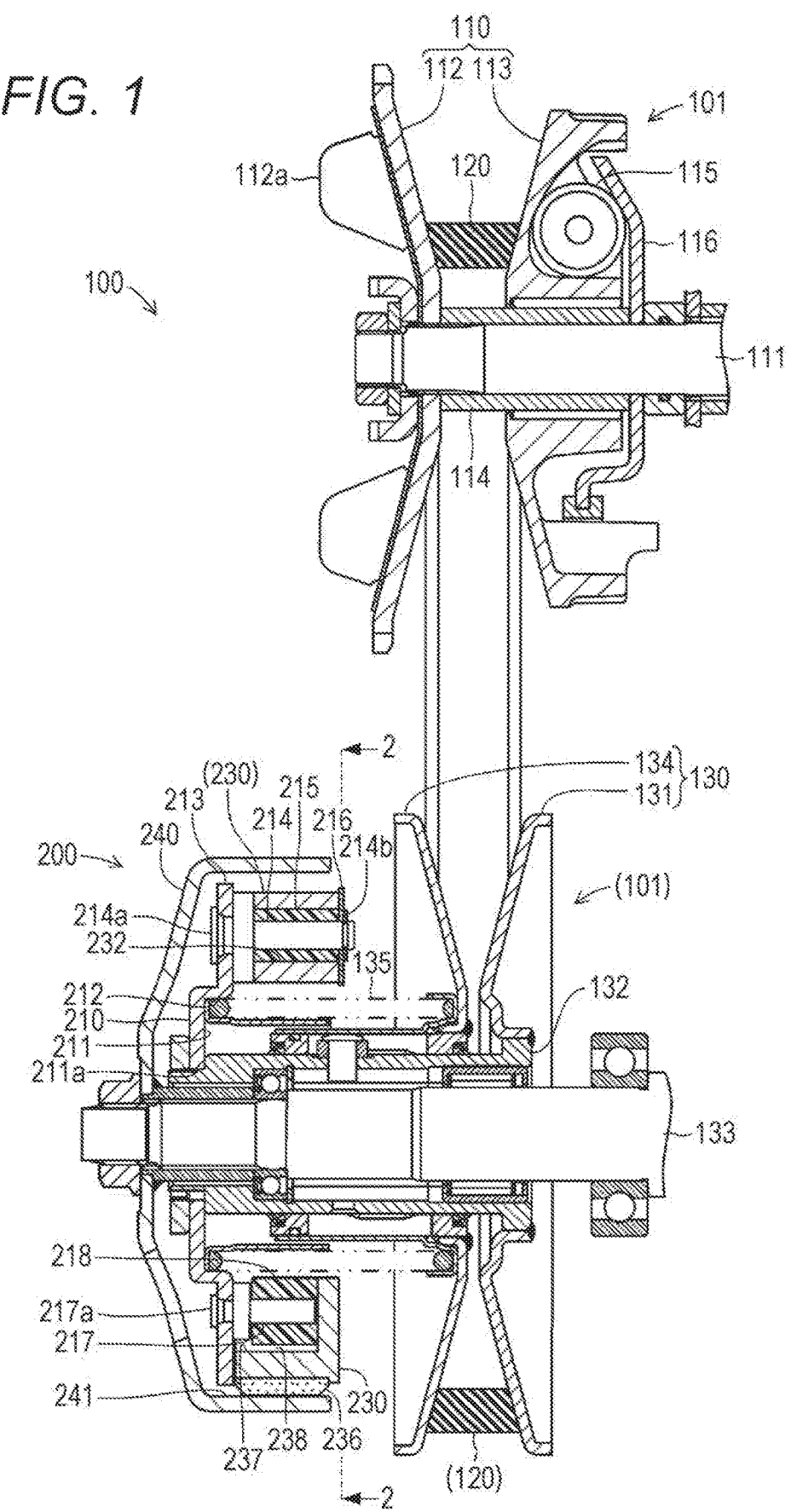
FIG. 1 is a plan sectional view schematically illustrating a configuration of a power transmission mechanism including a centrifugal clutch according to the present invention.
Figure 2:
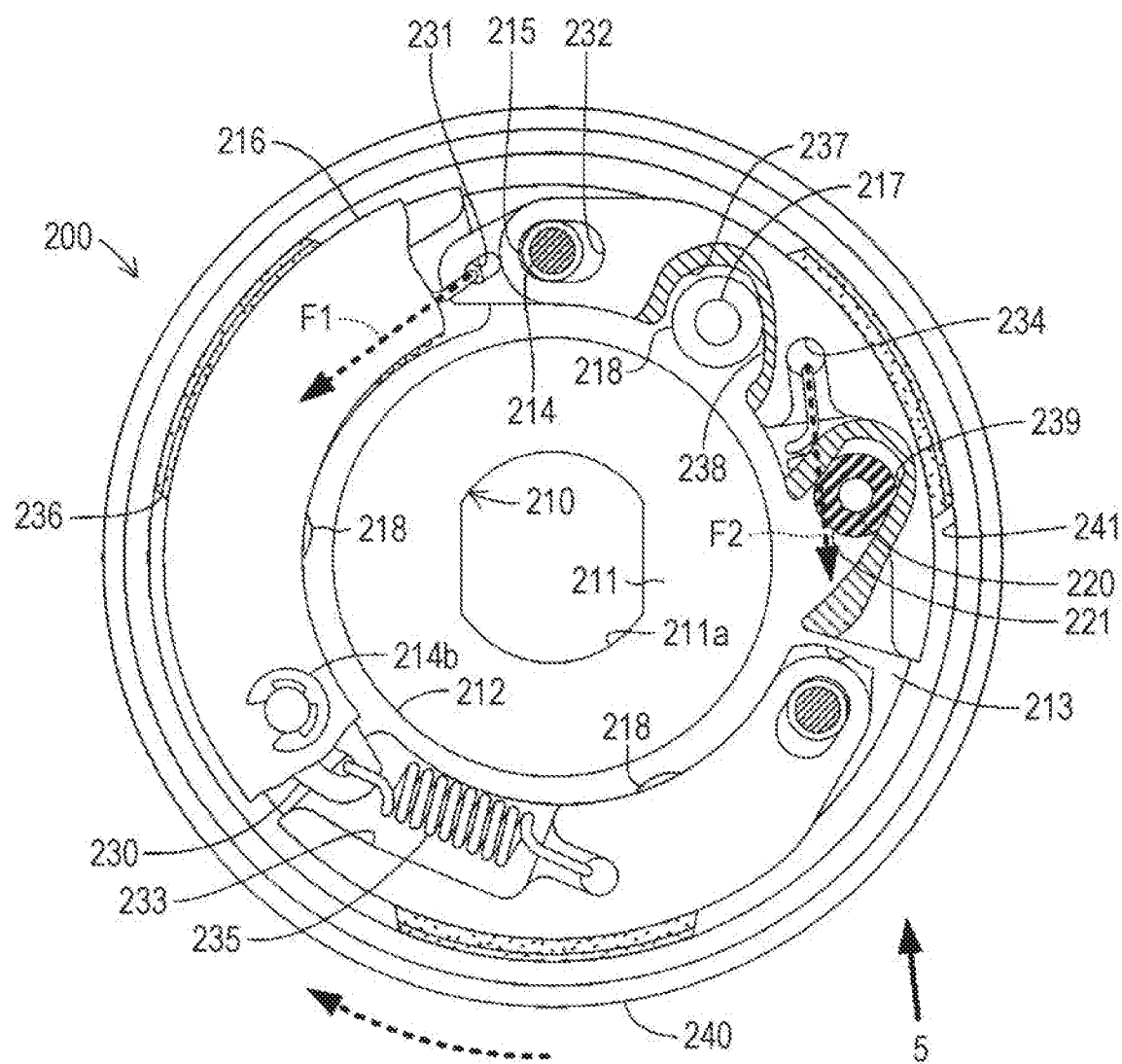
FIG. 2 is a side view of the centrifugal clutch as seen from a 2-2 line illustrated in FIG. 1.

Hereinafter, one embodiment of a centrifugal clutch according to the present invention will be described with reference to the drawings. FIG. 1 is a plan sectional view schematically illustrating a configuration of a power transmission mechanism 100 including a centrifugal clutch 200 according to the present invention. Moreover, FIG. 2 is a side view of the centrifugal clutch 200 as seen from a 2-2 line illustrated in FIG. 1. The power transmission mechanism 100 including the centrifugal clutch 200 is a mechanical device mainly provided between an engine and a rear wheel as a drive wheel in a motorcycle such as a scooter to transmit rotary drive force to the rear wheel or block such transmission while automatically changing a reduction ratio with respect to the number of rotations of the engine.

(Configuration of Centrifugal Clutch 200)

The power transmission mechanism 100 mainly includes each of a transmission 101 and the centrifugal clutch 200. The transmission 101 is a mechanical device configured to reduce speed steplessly to transmit the rotary drive force from the not-shown engine to the centrifugal clutch 200. The transmission 101 mainly includes each of a drive pulley 110, a V-belt 120, and a driven pulley 130. Of these components, the drive pulley 110 is provided on a crankshaft 111 extending from the engine, and is a mechanical device to be directly rotatably driven by the rotary drive force of the engine. The drive pulley 110 mainly includes each of a stationary drive plate 112 and a movable drive plate 113

The stationary drive plate 112 is a component to be rotatably driven in a state in which the V-belt 120 is sandwiched and held by the stationary drive plate 112 and the movable drive plate 113. The stationary drive plate 112 is formed in such a manner that a metal material is formed into a conical tubular shape. The stationary drive plate 112 is attached onto the crankshaft 111 in a fixed manner in a state in which a raised-side surface of the stationary drive plate 112 faces a movable drive plate 113 side (an engine side). That is, the stationary drive plate 112 is constantly rotatably driven together with the crankshaft 111. Moreover, multiple radiation fins 112a are, on a recessed-side surface of the stationary drive plate 112, provided radially about the axis of the crankshaft 111.

The movable drive plate 113 is a component to be rotatably driven in a state in which the V-belt 120 is sandwiched and held by the movable drive plate 113 and the stationary drive plate 112. The movable drive plate 113 is formed in such a manner that a metal material is formed into a conical tubular shape. The movable drive plate 113 is attached to the crankshaft 111 in a state in which a raised-side surface of the movable drive plate 113 faces the stationary drive plate 112. In this case, the movable drive plate 113 is, through an impregnated bush, attached onto a sleeve bearing 114 fitted onto the crankshaft 111 in a fixed manner. The movable drive plate 113 is attached to the sleeve bearing 114 to freely slide in each of an axial direction and a circumferential direction.

On the other hand, on a recessed-side surface of the movable drive plate 113, multiple roller weights 115 are provided in a state in which the roller weights 115 are pressed by a lamp plate 116. The roller weight 115 is a component configured to displace outward in a radial direction according to an increase in the number of rotations of the movable drive plate 113 to press the movable drive plate 113 to a stationary drive plate 112 side in cooperation with the lamp plate 116. The roller weight 115 is formed in such a manner that a metal material is formed into a tubular shape. Moreover, the lamp plate 116 is a component configured to press the roller weights 115 to the movable drive plate 113 side. The lamp plate 116 is formed in such a manner that a metal plate is bent to the movable drive plate 113 side.

The V-belt 120 is a component configured to transmit rotary drive force of the drive pulley 110 to the driven pulley 130. The V-belt 120 is formed in such an endless ring shape that a core wire is covered with an elastic material such as rubber material. The V-belt 120 is arranged between the stationary drive plate 112 and the movable drive plate 113 and between a stationary driven plate 131 and a movable driven plate 134 of the driven pulley 130, and is bridged between the drive pulley 110 and the driven pulley 130.

The driven pulley 130 is a mechanical device to be rotatably driven by the rotary drive force from the engine, the rotary drive force being transmitted through each of the drive pulley 110 and the V-belt 120. The driven pulley 130 mainly includes each of the stationary driven plate 131 and the movable driven plate 134.

The stationary driven plate 131 is a component to be rotatably driven in a state in which the V-belt 120 is sandwiched and held by the stationary driven plate 131 and the movable driven plate 134. The stationary driven plate 131 is formed in such a manner that a metal material is formed into a conical tubular shape. The stationary driven plate 131 is attached onto a driven sleeve 132 in a fixed manner in a state in which a raised-side surface of the stationary driven plate 131 faces a movable driven plate 134 side.

The driven sleeve 132 is a metal tubular component to be rotatably driven together with the stationary driven plate 131. The driven sleeve 132 is attached to a drive shaft 133 to freely rotate relative to the drive shaft 133 through a bearing. The drive shaft 133 is a metal rotary shaft body configured to drive, through the not-shown transmission, the rear wheel of the motorcycle on which the power transmission mechanism 100 is mounted. In this case, the rear wheel of the motorcycle is attached to one (the right side as viewed in the figure) end portion of the drive shaft 133

The movable driven plate 134 is a component to be rotatably driven in a state in which the V-belt 120 is sandwiched and held by the movable driven plate 134 and the stationary driven plate 131. The movable driven plate 134 is formed in such a manner that a metal material is formed into a conical tubular shape. The movable driven plate 134 is fitted onto the driven sleeve 132 to freely slide in the axial direction in a state in which a raised-side surface of the movable driven plate 134 faces the stationary driven plate 131.

On the other hand, a torque spring 135 is, on a recessed-side surface of the movable driven plate 134, provided between such a recessed-side surface and a drive plate 210 of the centrifugal clutch 200. The torque spring 135 is a coil spring configured to elastically press the movable driven plate 134 to a stationary driven plate 131 side. That is, the transmission 101 steplessly changes the number of rotations of the engine according to a size relationship between a diameter defined by a clearance between the stationary drive plate 112 and the movable drive plate 113 and provided to sandwich the V-belt 120 and a diameter defined by a clearance between the stationary driven plate 131 and the movable driven plate 134 and provided to sandwich the V-belt 120. Moreover, the centrifugal clutch 200 is provided on each tip end side of the driven sleeve 132 and the drive shaft 133.

The centrifugal clutch 200 is a mechanical device configured to transmit the rotary drive force, which has been transmitted through the transmission 101, of the engine to the drive shaft 133 or block such transmission. The centrifugal clutch 200 mainly includes each of the drive plate 210, three clutch weights 230, and a clutch outer 240.

Figure 3:
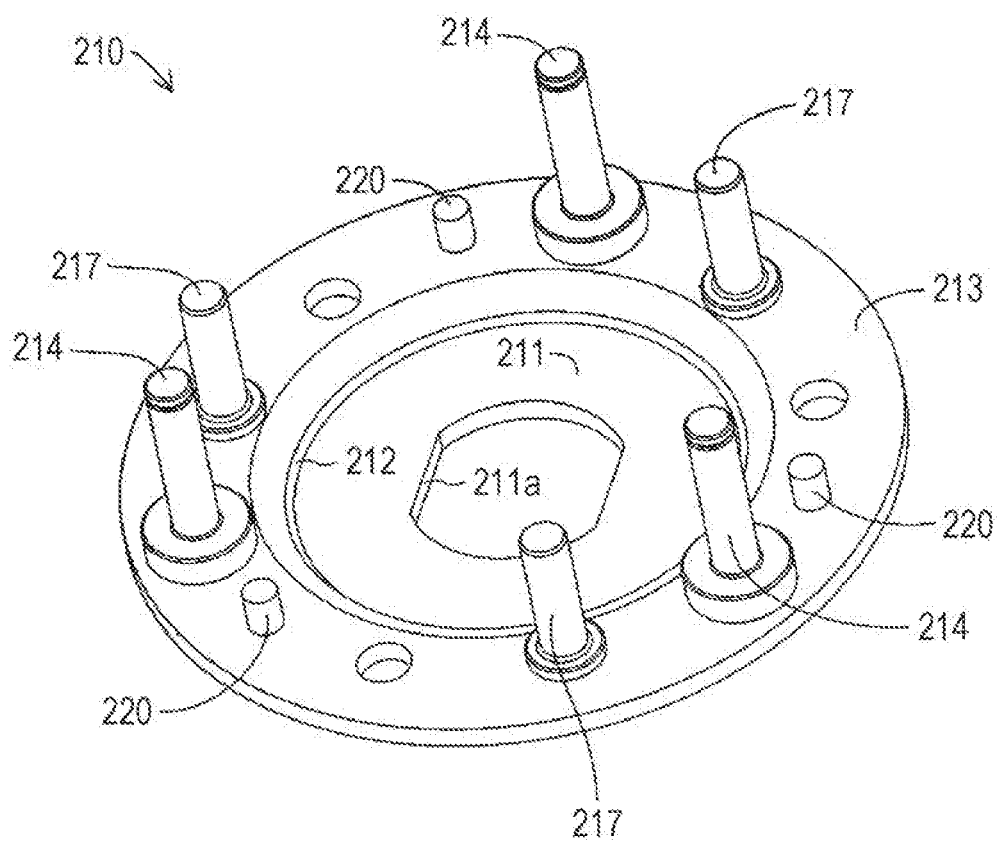
FIG. 3 is a perspective view schematically illustrating an external configuration of a drive plate in the centrifugal clutch illustrated in each of FIGS. 1 and 2.

The drive plate 210 is a component to be rotatably driven together with the driven sleeve 132. The drive plate 210 is formed in such a manner that a metal material is formed into a stepped discoid shape. More specifically, as illustrated in each of FIGS. 3 and 4, the drive plate 210 is formed with a through-hole 211a at a center portion of a flat plate-shaped bottom portion 211 such that the driven sleeve 132 penetrates the through-hole 211a, and is formed with a flange portion 213 at a tip end portion of a tube portion 212 standing at the periphery of the bottom portion 211 such that the flange portion 213 projects in a flange shape. At the flange portion 213, three swing support pins 214, three cam body support pins 217, and three damper receiving pins 220 are provided at equal intervals along the circumferential direction.

The swing support pin 214 is a component configured to turnably support one end side of a clutch weight 230 described later to swing the other end side. The swing support pin 214 is formed as a metal stepped rod. In this case, the swing support pin 214 is attached to the flange portion 213 in a fixed manner by an attachment bolt 214a. The swing support pin 214 provides support in a state in which the swing support pin 214 penetrates a pin slide hole 232 of the clutch weight 230 through a pivot-point-side slide member 215 at an outer peripheral portion of the swing support pins 214 and a state in which the clutch weight 230 is sandwiched through each of an E-ring 214b attached to a tip end portion of the swing support pin 214 and a side plate 216 arranged between the E-ring 214b and the clutch weight 230.

The pivot-point-side slide member 215 is a component arranged between the swing support pin 214 and the pin slide hole 232 to improve slidability therebetween. The pivot-point-side slide member 215 is formed in a cylindrical shape from a resin material. The pivot-point-side slide member 215 is formed to have such inner and outer diameters that the swing support pin 214 and the pin slide hole 232 can rotatably slide relative to each other, i.e., a dimensional tolerance as a clearance fit for each of the swing support pin 214 and the pin slide hole 232.

Moreover, thermoplastic resin or thermosetting resin having thermal resistance and abrasion resistance can be used as the resin material forming the pivot-point-side slide member 215, and engineering plastic or super engineering plastic is preferable. Specifically, polyetheretherketone resin (PEEK), polyphenylene sulfide resin (PPS), polyamide-imide resin (PAI), fluorine resin (PTFE), or polyimide resin (PI) can be used as the thermoplastic resin. Diallyphthalate resin (PDAP), epoxy resin (EP), or silicon resin (SI) can be used as the thermosetting resin.

The side plate 216 is a component configured to prevent detachment of three clutch weights 230 from the swing support pins 214. The side plate 216 is formed in such a manner that a metal material is formed into a ring shape. The side plate 216 is arranged on the opposite side of three clutch weights 230 from the drive plate 210 in a state in which the side plate 216 faces each clutch weight 230.

The cam body support pin 217 is a component configured to rotatably support a plate-side cam body 218. The cam body support pin 217 is formed as a metal stepped rod. With an attachment bolt 217a, the cam body support pin 217 is, in a fixed manner, attached onto the flange portion 213 facing a tip-end-side portion of the clutch weight 230 with respect to the pin slide hole 232.

The plate-side cam body 218 is a component configured to press the clutch weight 230 to a clutch outer 240 side. The plate-side cam body 218 is formed in such a manner that a resin material is formed into a cylindrical shape. In this case, the plate-side cam body 218 is formed to have such an inner diameter that the plate-side cam body 218 can rotatably slide on the cam body support pin 217, i.e., a dimensional tolerance as a so-called clearance fit for the cam body support pin 217. Moreover, the resin material forming the plate-side cam body 218 is similar to the resin material forming the pivot-point-side slide member 215.

Figure 5:
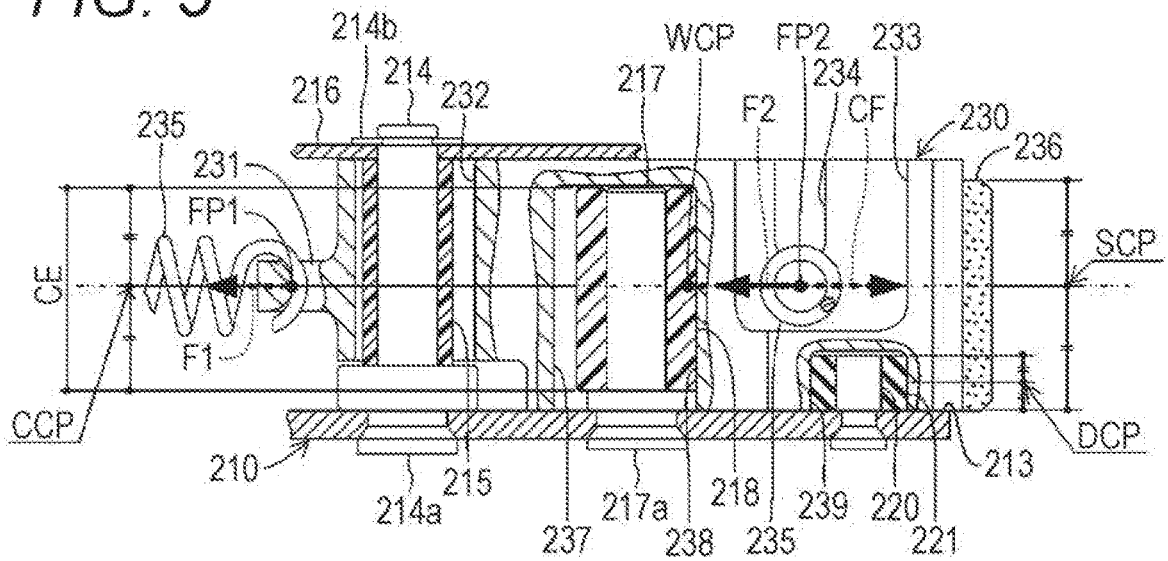
FIG. 5 is a partially-broken sectional view illustrating configurations of the clutch weight and the plate-side cam body in the centrifugal clutch as viewed from an arrow 5 illustrated in FIG. 2.

As illustrated in FIG. 5, each of these plate-side cam bodies 218 is provided such that a center portion CCP is coincident with a barycentric position WCP of the clutch weight 230 in a thickness direction thereof. The center portion CCP is a center portion of the plate-side cam body 218 in the thickness direction of the clutch weight 230 in a cam contact area CE in the thickness direction of the clutch weight 230 as a portion of the plate-side cam body 218 contacting a later-described weight-side cam body 238. The center portion CCP described herein is the position of a midpoint at which the thickness direction in the cam contact area CE is divided in half. Note that the center portion CCP does not precisely mean only the midpoint, but includes the periphery of the midpoint which can be substantially taken as the midpoint.

The damper receiving pin 220 is a component configured to support a damper 221. The damper receiving pin 220 is formed as a metal rod. The damper 221 is a component configured to guide swing motion for causing the other end side of the clutch weight 230 to approach or separate from the clutch outer 240 and serving as a buffer material upon separation. The damper 221 is formed in such a manner that an elastic body such as a rubber material or an elastomer material is formed into a cylindrical shape. The damper 221 is fitted onto an outer peripheral surface of the damper receiving pin 220 in a fixed manner. In this case, the damper 221 is provided at a position closer to a drive plate 210 side than the barycentric position WCP of the clutch weight 230 in the thickness direction (an upper-lower direction as viewed in the figure) thereof is to. Note that the damper 221 may be rotatably attached onto the outer peripheral surface of the damper receiving pin 220.

Figure 4:
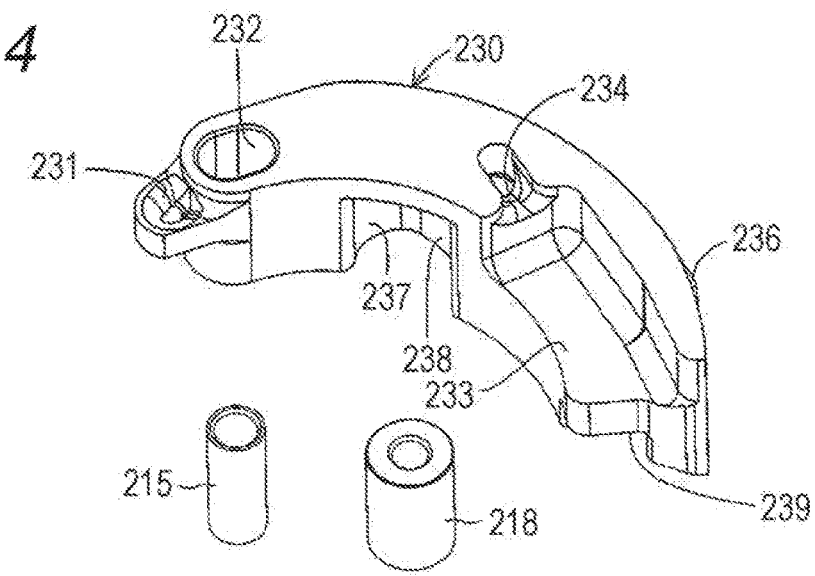
FIG. 4 is a partial exploded perspective view illustrating the state of assembly of the drive plate, a pivot-point-side slide member, a plate-side cam body, and a clutch weight in the centrifugal clutch illustrated in each of FIGS. 1 and 2.
Figure 4:
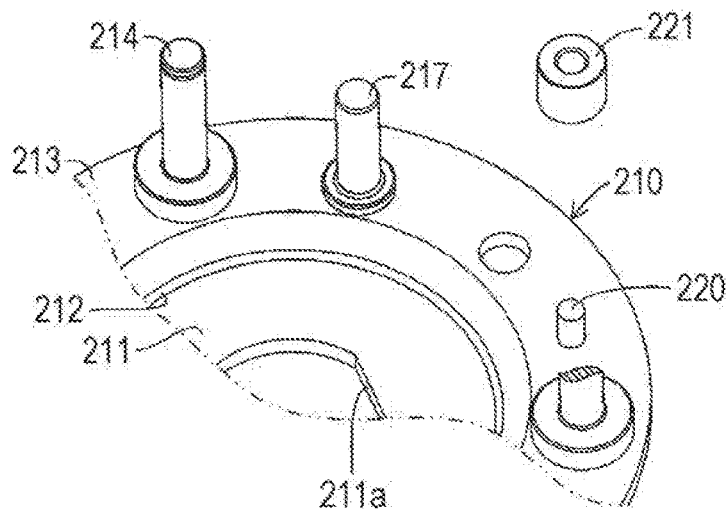
Figure 6:
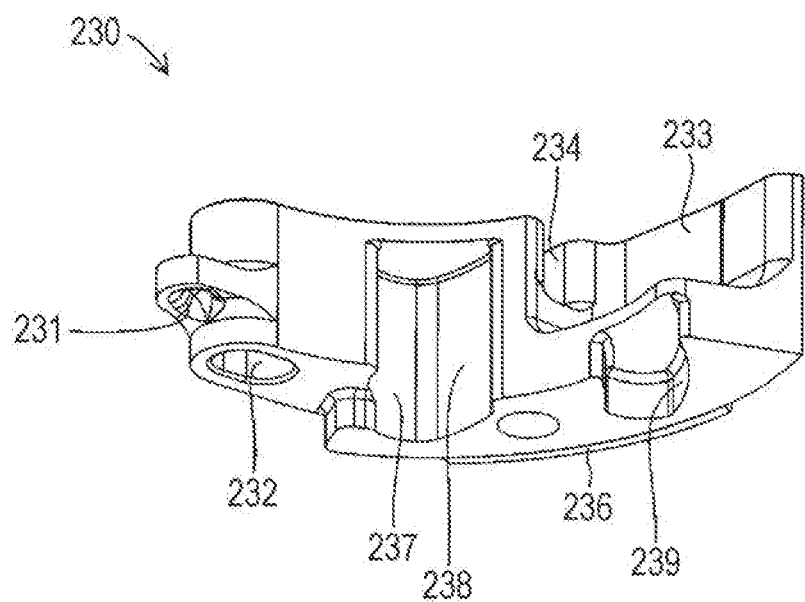
FIG. 6 is a perspective view illustrating, from the point of view from a drive plate side, the outline of an external configuration of the clutch weight in the centrifugal clutch illustrated in each of FIGS. 1 and 2.

As illustrated in each of FIGS. 4 and 6, each of three clutch weights 230 is a component configured to contact or separate from the clutch outer 240 through a clutch shoe 236 according to the number of rotations of the drive plate 210 to transmit the rotary drive force from the engine to the drive shaft 133 or block such transmission. The clutch weight 230 is formed in such a manner that a metal material (e.g., a zinc material) is formed into a curved shape extending along the circumferential direction of the drive plate 210.

At each of these clutch weights 230, each of a first spring attachment portion 231 and the pin slide hole 232 is formed on one (left) end side, and a spring housing portion 233 is formed on the other (right as viewed in the figure) end side. The first spring attachment portion 231 is a portion for coupling one end portion of a coupling spring 235 bridged between the clutch weights 230 adjacent to each other on one end side. The first spring attachment portion 231 includes a through-hole formed at one (left) end portion of the clutch weight 230. In this case, the first spring attachment portion 231 is formed at a position coincident with the barycentric position WCP of the clutch weight 230 in the thickness direction thereof. That is, the first spring attachment portion 231 is, in the present embodiment, formed at a center portion of the clutch weight 230 in the thickness direction thereof.

In each of these clutch weights 230, the other end side is coupled to an adjacent one of the clutch weights 230 by the coupling spring 235 in a state in which one end side is turnably supported by the swing support pin 214 and the pivot-point-side slide member 215 through the pin slide hole 232. The other end side is pulled in an inward direction of the drive plate 210. That is, the clutch weight 230 is supported on the drive plate 210 through each of the swing support pin 214, the pivot-point-side slide member 215, and the pin slide hole 232 in a state in which the other end side provided with the clutch shoe 236 is swingable relative to the clutch outer 240.

The pin slide hole 232 is a portion in which the swing support pin 214 of the drive plate 210 is turnably and slidably fitted through the pivot-point-side slide member 215. The pin slide hole 232 is formed as a through-hole penetrating the clutch weight 230 in the thickness direction thereof. The pin slide hole 232 is formed in a long hole shape such that one end side of the clutch weight 230 displaces backward in the rotary drive direction of the drive plate 210 when the clutch shoe 236 contacts the clutch outer 240.

In this case, a long hole forming the pin slide hole 232 is formed such that a length in one direction is longer than that in a width direction perpendicular to the one direction and the entirety of the long hole extends long and thin. More specifically, the pin slide hole 232 is formed to have an inner diameter as a clearance fit slightly larger than the outer diameter of the pivot-point-side slide member 215 in the width direction as the radial direction of the drive plate 210. On the other hand, a longitudinal direction of the pin slide hole 232 extends in an arc shape or a linear shape in such a direction that displacement of the clutch weight 230 to a side on which pressing of a weight-side cam body 238 of the clutch weight 230 against the plate-side cam body 218 is increased and climbing is more promoted is allowed.

In the present embodiment, the pin slide hole 232 is formed to extend in an arc shape to the front side in the rotary drive direction of the drive plate 210. In this case, in the present embodiment, two arcs forming the longitudinal direction of the pin slide hole 232 are concentric with the drive plate 210, but are not necessarily concentric.

The spring housing portion 233 is a portion for housing the coupling spring 235 bridged between the clutch weights 230 adjacent to each other on the other end side opposite to the first spring attachment portion 231. The spring housing portion 233 is formed in a recessed shape. A second spring attachment portion 234 is formed at an end portion of the spring housing portion 233 on a pin slide hole 232 side. The second spring attachment portion 234 is a portion for coupling the other end portion of the coupling spring 235 housed in the spring housing portion 233. The other end portion is the opposite side of one end portion, which is hooked on the first spring attachment portion 231, of both end portions of the coupling spring 235. The second spring attachment portion 234 is formed as a through-hole. The second spring attachment portion 234 is formed at the same position as that of the first spring attachment portion 231 in the thickness direction of the clutch weight 230, i.e., a position coincident with the barycentric position WCP of the clutch weight 230 in the thickness direction thereof.

The coupling spring 235 is a component configured to pull the other end side in a direction in which the other end side is separated from the clutch outer 240 by action of force F1, F2 as pull force on the clutch weight 230. The coupling spring 235 includes a metal coil spring. The coupling spring 235 is bridged between adjacent ones of the clutch weights 230 along the circumferential direction of the drive plate 210. More specifically, one of both end portions of the coupling spring 235 is hooked on the first spring attachment portion 231 of the clutch weight 230. Further, the other one of both end portions of the coupling spring 235 is hooked on the second spring attachment portion 234 of the clutch weight 230 adjacent to the clutch weight 230 formed with the first spring attachment portion 231.

That is, in each of these clutch weights 230, both end portions in the circumferential direction of the drive plate 210 are, in a state in which one end side is turnably supported by the swing support pin 214 through the pin slide hole 232, coupled by two coupling springs 235 each bridged between adjacent ones of the clutch weights 230. In this case, the second spring attachment portion 234 is formed at a position further from the pin slide hole 232 than the first spring attachment portion 231 is.

With this configuration, each clutch weight 230 is attached onto the drive plate 210 in a state in which the clutch weight 230 is pulled in the inward direction of the drive plate 210 by the force F1, F2 as the pull force of two coupling springs 235 and a state in which the other end side is separated from the clutch outer 240 by the pull force F2 of the coupling spring 235. Moreover, in this case, the first spring attachment portion 231 and the second spring attachment portion 234 are, as described above, each formed at the positions coincident with the barycentric position WCP of the clutch weight 230. That is, the positions FP1, FP2 of action of the force F1, F2 of the coupling spring 235 on the clutch weight 230 are coincident with the barycentric position WCP of the clutch weight 230, and are within the cam contact area CE.

Note that for the sake of simplicity in description of a configuration of the clutch weight 230, FIG. 2 illustrates surfaces, which are cut in different thickness directions, of two spots at one of three clutch weights 230. Further, FIG. 2 illustrates, by a dashed arrow, each of rotary drive directions of the drive plate 210 and the clutch outer 240 in the centrifugal clutch 200. Moreover, in FIG. 2, the force F1, F2 of the coupling spring 235 acting on the clutch weight 230 is indicated by dashed arrows. Further, in FIG. 5, the force F1, F2 of the coupling spring 235 acting on the clutch weight 230 is indicated by dashed arrows. In addition, in FIG. 5, a line extending in a direction (a right-left direction as viewed in the figure) perpendicular to the thickness direction (the upper-lower direction as viewed in the figure) through the barycentric position WCP of the clutch weight 230 is indicated by a chain double-dashed line.

The clutch shoe 236 is a component configured to increase friction force for an inner peripheral surface of the clutch outer 240. The clutch shoe 236 is formed in such a manner that a friction material is formed into a plate shape extending in an arc shape. The clutch shoe 236 is provided on an outer peripheral surface of each clutch weight 230 on a tip end side opposite to the pin slide hole 232. In this case, the clutch shoe 236 is provided such that a center portion SCP in the thickness direction is coincident with the barycentric position WCP of the clutch weight 230. The center portion SCP described herein is a midpoint at which a thickness direction of the clutch shoe 236 is divided in half. Note that the center portion SCP does not precisely mean only the midpoint, but includes the periphery of the midpoint which can be substantially taken as the midpoint.

Moreover, at a surface of each clutch weight 230 facing the drive plate 210, a plate-side cam body relief 237 in a shape recessed to cover the plate-side cam body 218 is formed, and a damper groove 239 in a shape recessed to cover the damper 221 is formed. The plate-side cam body relief 237 is a portion at which the weight-side cam body 238 configured to climb on the plate-side cam body 218 is formed. The plate-side cam body relief 237 is formed in a groove shape opening at an inner peripheral surface of the clutch weight 230 and extending to a far side, and is formed in such a manner that such a far-side portion is cut out in an arc shape not to contact the plate-side cam body 218.

The weight-side cam body 238 is a portion for displacing the clutch weight 230 to the clutch outer 240 side in cooperation with the plate-side cam body 218. The weight-side cam body 238 includes a smooth curved surface facing the rear side in the rotary drive direction of the drive plate 210. More specifically, the weight-side cam body 238 is formed in an arc shape, and a sliding surface to be pressed against the plate-side cam body 218 extends curved toward an outer rear side in the rotary drive direction of the drive plate 210.

The damper groove 239 is a portion for housing the damper 221 with the damper 221 being sandwiched by the damper groove 239. The damper groove 239 opens at the inner peripheral surface of the clutch weight 230. Further, the damper groove 239 is formed in a groove shape extending while curving along a turning displacement direction in which the clutch weight 230 approaches or separates from the clutch outer 240.

The clutch weight 230 is formed such that the barycentric position WCP of the clutch weight 230 itself, i.e., a position which can be taken as a position on which resultant force CF of centrifugal force acting on the entirety of the clutch weight 230 acts upon rotary drive of the drive plate 210, is at the center portion in the thickness direction. Moreover, each of the center portion CCP in the cam contact area CE between the plate-side cam body 218 and the weight-side cam body 238, the center portion SCP of the clutch shoe 236 in the thickness direction thereof, and the positions FP1, FP2 of action of the force F1, F2 as the pull force of the coupling spring 235 is coincident with the barycentric position WCP of the clutch weight 230.

Note that coincidence with the barycentric position WCP of the clutch weight 230 as described herein means, needless to say, not only precise perfect coincidence but also an acceptable deviation range which can be taken as substantially coincident within a scope in which the advantageous effects of the invention of the present application can be provided. Moreover, in the present embodiment, the barycentric position WCP is set to the center portion of the clutch weight 230 in the thickness direction thereof. Needless to say, the barycentric position WCP may be a location other than the center position.

The clutch outer 240 is a component to be rotatably driven together with the drive shaft 133. The clutch outer 240 is formed in such a manner that a metal material is formed into a cup shape covering the outer peripheral surface of the clutch weight 230 from the drive plate 210. That is, the clutch outer 240 has a cylindrical surface 241 configured to friction-contact the clutch shoe 236 of the clutch weight 230 displaced to an outer peripheral side of the drive plate 210.

(Operation of Centrifugal Clutch 200)

Next, operation of the centrifugal clutch 200 configured as described above will be described with reference to FIGS. 7 to 9. Note that in FIGS. 7 to 9, the E-ring 214*b*, the side plate 216, and the coupling spring 235 are not shown. Moreover, in FIGS. 8 and 9, the rotary drive directions of the drive plate 210 and the clutch outer 240 in the centrifugal clutch 200 are each indicated by dashed arrows. Further, in FIGS. 8 and 9, a rotation direction of the plate-side cam body 218 is indicated by a dashed arrow.

Figure 7:
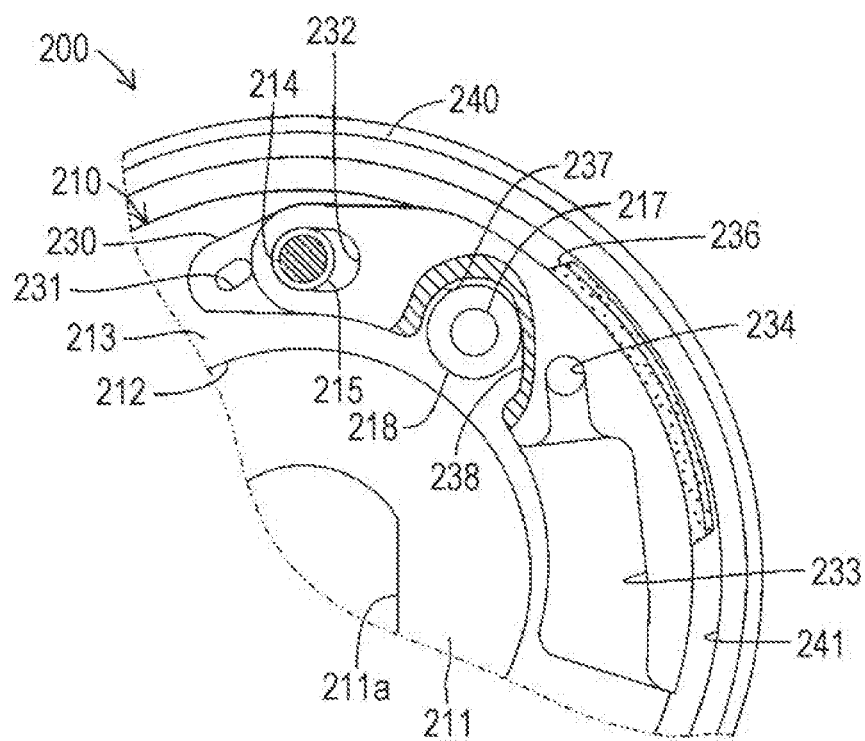
FIG. 7 is a partially-enlarged view illustrating a clutch-OFF state in which a clutch shoe does not contact a clutch outer in the centrifugal clutch illustrated in FIG. 2.

The centrifugal clutch 200 functions as part of the power transmission mechanism 100 arranged between the engine and the rear wheel as the drive wheel in the motorcycle (e.g., the scooter). First, in a case where the engine is in an idling state, the centrifugal clutch 200 blocks transmission of the drive force between the engine and the drive shaft 133 as illustrated in FIG. 7. Specifically, in the centrifugal clutch 200, the drive plate 210 is rotatably driven and the clutch weight 230 is rotatably driven by the rotary drive force of the engine transmitted through the transmission 101.

However, in this case, in the centrifugal clutch 200, the centrifugal force acting on the clutch weight 230 is smaller than the force F2 as elastic force (the pull force) of the coupling spring 235. Thus, the clutch shoes 236 do not contact the cylindrical surface 241 of the clutch outer 240, and therefore, the centrifugal clutch 200 is in a clutch-OFF state in which the rotary drive force of the engine is not transmitted to the drive shaft 133. In this clutch-OFF state, the clutch weight 230 is pulled by the pull force of one of two coupled coupling springs 235 hooked on the second spring attachment portion 234.

In this case, the pin slide hole 232 is formed in the long hole shape, and therefore, the clutch weight 230 displaces to the side of the coupling spring 235 hooked at the position adjacent to the weight-side cam body 238. With this configuration, the swing support pin 214 is positioned at a rear end portion of the pin slide hole 232 in the rotary drive direction of the drive plate 210 (see FIG. 7). Moreover, the weight-side cam body 238 maintains, by the force F1, F2 as the elastic force (the pull force) of the coupling spring 235, a state in which the weight-side cam body 238 is pressed to contact a roller surface of the plate-side cam body 218.

That is, the clutch weight 230 is, by two coupling springs 235, brought into a state in which the clutch weight 230 is closed inward in the radial direction of the drive plate 210. However, in this case, the swing support pin 214 and the pin slide hole 232 are fitted to each other through the pivot-point-side slide member 215 by clearance fit, and therefore, it is assumed that inward tilt in the radial direction of the drive plate 210 occurs due to the force F1, F2 of two coupling springs 235.

However, the clutch weight 230 is configured such that the center portion CCP in the cam contact area CE between the plate-side cam body 218 and the weight-side cam body 238 and the positions FP1, FP2 of action of the force F1, F2 as the pull force of the coupling spring 235 are coincident with the barycentric position WCP (see FIG. 5). With this configuration, the weight-side cam body 238 is, in the thickness direction of the clutch weight 230, pressed against the plate-side cam body 218 with substantially-equal force. Thus, the clutch weight 230 holds a posture standing on the drive plate 210 in the vertical direction without tilting inward in the radial direction about the plate-side cam body 218 as the point of origin.

Next, the centrifugal clutch 200 transmits the rotary drive force of the engine to the drive shaft 133 according to an increase in the number of rotations of the engine by driver's accelerator operation in the motorcycle. Specifically, in the centrifugal clutch 200, the centrifugal force acting on the clutch weight 230 becomes greater than the force F2 as the elastic force (the pull force) of the coupling spring 235 as the number of rotations of the engine increases. Thus, the clutch weight 230 turnably displaces outward in the radial direction about the swing support pin 214.

That is, in the centrifugal clutch 200, the clutch weight 230 turnably displaces to a cylindrical surface 241 side of the clutch outer 240 against each of the force F2 of the coupling spring 235 and sliding resistance between the damper 221 and the damper groove 239 as the number of rotations of the engine increases. As a result, the clutch shoe 236 contacts the cylindrical surface 241. In this case, in the clutch weight 230, the center portion SCP of the clutch shoe 236 in the thickness direction thereof is, in addition to the center portion CCP in the cam contact area CE between the plate-side cam body 218 and the weight-side cam body 238 and the positions FP1, FP2 of action of the force F1, F2 of the coupling spring 235, coincident with the barycentric position WCP of the clutch weight 230 (see FIG. 5). Thus, in the clutch weight 230, the clutch shoe 236 can contact the cylindrical surface 241 with the clutch shoe 236 holding a state parallel with the cylindrical surface 241.

Figure 8:
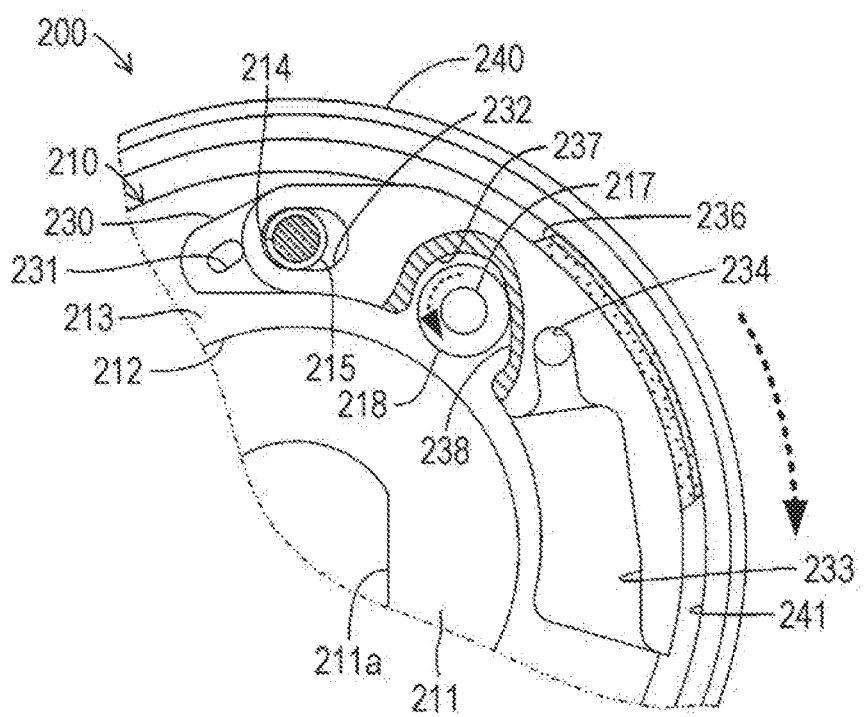
FIG. 8 is a partially-enlarged view illustrating a clutch-ON state in which the clutch shoe is pressed against the clutch outer in the centrifugal clutch illustrated in FIG. 7.

Next, in a case where the clutch shoe 236 contacts the cylindrical surface 241, the clutch weight 230 receives reactive force in the opposite direction of the rotary drive direction through the clutch shoe 236. In this case, the pin slide hole 232 is formed in the long hole shape along the circumferential direction of the drive plate 210, and the swing support pin 214 is positioned at the rear end portion of the pin slide hole 232 in the rotary drive direction of the drive plate 210. That is, as illustrated in FIG. 8, the clutch weight 230 is in a state in which backward displacement in the rotary drive direction of the drive plate 210 is allowed. Thus, the clutch weight 230 relatively displaces in the opposite direction of the rotary drive direction of the drive plate 210 by the reactive force received through the clutch shoe 236.

Accordingly, the weight-side cam body 238 formed at the clutch weight 230 is strongly pressed against the plate-side cam body 218. In this case, the plate-side cam body 218 is rotatably supported on the cam body support pins 217. Thus, the plate-side cam body 218 rotates counterclockwise as viewed in the figure by pressing by the weight-side cam body 238. Thus, in the clutch weight 230, the clutch shoe 236 is pushed to the clutch outer 240 side on the outside in the radial direction and is pressed against the cylindrical surface 241 as the weight-side cam body 238 climes on the plate-side cam body 218 while rotatably displacing the plate-side cam body 218. In this case, the plate-side cam body 218 is made of the resin material, and therefore, the plate-side cam body 218 can smoothly rotatably displace as compared to a case where both components are made of a metal material.

As a result, in the centrifugal clutch 200, after the clutch shoes 236 have contacted the cylindrical surface 241 of the clutch outer 240, the clutch shoes 236 are pressed against the cylindrical surface 241 in extremely-short time (in other words, instantaneously). Thus, the centrifugal clutch 200 is brought into a state in which the clutch weight 230 enters a portion between the plate-side cam body 218 and the clutch outer 240 in a wedge manner. Accordingly, the centrifugal clutch 200 is brought into a clutch-ON state in which the rotary drive force of the engine is fully transmitted to the drive shaft 133.

In this case, the pin slide hole 232 is formed with such a length that contact with the swing support pin 214 is avoided in a state in which the clutch weight 230 enters the portion between the plate-side cam body 218 and the clutch outer 240 in the wedge manner. That is, in the pin slide hole 232, a clearance is ensured between the pin slide hole 232 and the pivot-point-side slide member 215 even in a state in which the clutch weight 230 enters the portion between the plate-side cam body 218 and the clutch outer 240 in the wedge manner. This prevents interference with entrance of the clutch weight 230 into the portion between the plate-side cam body 218 and the clutch outer 240.

In this clutch-ON state, the centrifugal clutch 200 maintains a state in which the clutch shoes 236 are pressed against the cylindrical surface 241 of the clutch outer 240. Thus, the drive plate 210 and the clutch outer 240 are rotatably driven together. With this configuration, the rear wheel of the motorcycle is rotatably driven by the rotary drive force of the engine so that the motorcycle can run.

On the other hand, in a case where the number of rotations of the engine decreases, the centrifugal clutch 200 blocks transmission of the rotary drive force of the engine to the drive shaft 133. Specifically, in the centrifugal clutch 200, the centrifugal force acting on the clutch weight 230 becomes smaller than the elastic force (the pull force) of the coupling spring 235 as the number of rotations of the engine decreases. Thus, the clutch weight 230 turnably displaces inward in the radial direction about the swing support pin 214.

Figure 9:
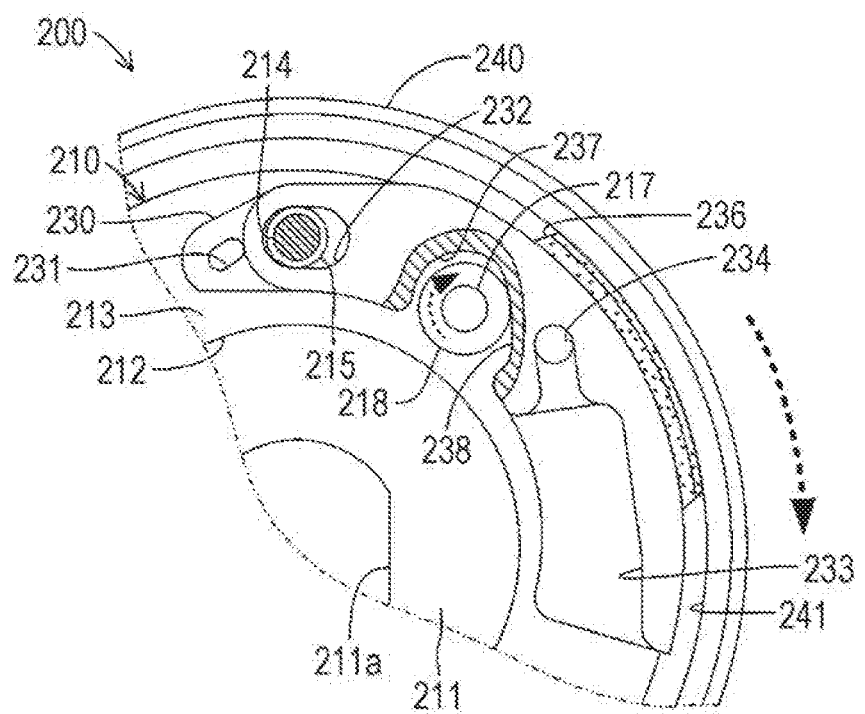
FIG. 9 is a partially-enlarged view illustrating a state right before the clutch weight turns inward in a radial direction of the drive plate in the centrifugal clutch illustrated in FIG. 7.

In this case, as illustrated in FIG. 9, the pin slide hole 232 is formed in the long hole shape along the circumferential direction of the drive plate 210, and the swing support pin 214 is positioned slightly on the front side with respect to the rear end portion of the pin slide hole 232 in the rotary drive direction of the drive plate 210. That is, the clutch weight 230 is in a state in which forward displacement in the rotary drive direction of the drive plate 210 is allowed. Thus, the clutch weight 230 rotatably displaces relative to the drive plate 210 toward the front side in the rotary drive direction of the drive plate 210 by the elastic force (the pull force) of the coupling spring 235.

Accordingly, while the weight-side cam body 238 is rotatably displacing the plate-side cam body 218 clockwise as viewed in the figure, the clutch weight 230 turnably displaces to the front side in the rotary drive direction of the drive plate 210 and the inside in the radial direction to return to an original position (a position upon idling as described above) (see FIG. 7). That is, the centrifugal clutch 200 is brought into the clutch-OFF state in which the clutch shoes 236 do not contact the clutch outer 240 and no rotary drive force is transmitted.

Even in a case where the number of rotations of the engine decreases as described above, each of the center portion CCP in the cam contact area CE between the plate-side cam body 218 and the weight-side cam body 238, the positions FP1, FP2 of action of the force F1, F2 of the coupling spring 235, and the center portion SCP of the clutch shoe 236 in the thickness direction thereof is coincident with the barycentric position WCP of the clutch weight 230 in the clutch weight 230. With this configuration, the clutch weight 230 can turnably displace to the front side in the rotary drive direction of the drive plate 210 and the inside in the radial direction to return to the original position (the position upon idling as described above) without tilting in the course of return (see FIG. 7).

As can be understood from operation description above, according to the above-described embodiment, in the centrifugal clutch 200, the center portion CCP of the portion, at which the plate-side cam body 218 and the weight-side cam body 238 contact each other, in the thickness direction and the positions FP1, FP2 of action of the force of the coupling spring 235 in the thickness direction of the clutch weight 230 are formed coincident with the barycentric position WCP of the clutch weight 230. Thus, in the centrifugal clutch 200 according to the present invention, tilt of the clutch weight 230 can be more effectively reduced by action of the force of the coupling spring 235 on the barycentric position WCP of the turning clutch weight 230 and turning of the plate-side cam body 218 and the weight-side cam body 238 in contact with each other.

Thus, in the centrifugal clutch 200 according to the present invention, occurrence of uneven wear of the clutch weight 230 and the clutch shoe 236 can be reduced, and the clutch weight can be smoothly swung.

Further, implementation of the present invention is not limited to the above-described embodiment, and various changes can be made without departing from the gist of the present invention.

For example, in the above-described embodiment, the centrifugal clutch 200 is configured such that each of the center portion CCP in the cam contact area CE between the plate-side cam body 218 and the weight-side cam body 238, the positions FP1, FP2 of action of the force F1, F2 of the coupling spring 235, and the center portion SCP of the clutch shoe 236 in the thickness direction thereof is coincident with the barycentric position WCP of the clutch weight 230. However, it may be enough that the centrifugal clutch 200 is configured such that at least one of the center portion CCP in the cam contact area CE between the plate-side cam body 218 and the weight-side cam body 238 or the positions FP1, FP2 of action of the force F1, F2 of the coupling spring 235 is coincident with the barycentric position WCP.

Thus, it can be configured such that each of the center portion CCP in the cam contact area CE between the plate-side cam body 218 and the weight-side cam body 238 and the positions FP1, FP2 of action of the force F1, F2 of the coupling spring 235 is coincident with the barycentric position WCP of the clutch weight 230 and the center portion SCP of the clutch shoe 236 in the thickness direction thereof is not coincident with the barycentric position WCP. Alternatively, it can be configured such that only the center portion CCP in the cam contact area CE between the plate-side cam body 218 and the weight-side cam body 238 or only the positions FP1, FP2 of action of the force F1, F2 of the coupling spring 235 is/are coincident with the barycentric position WCP of the clutch weight 230.

Figure 10:
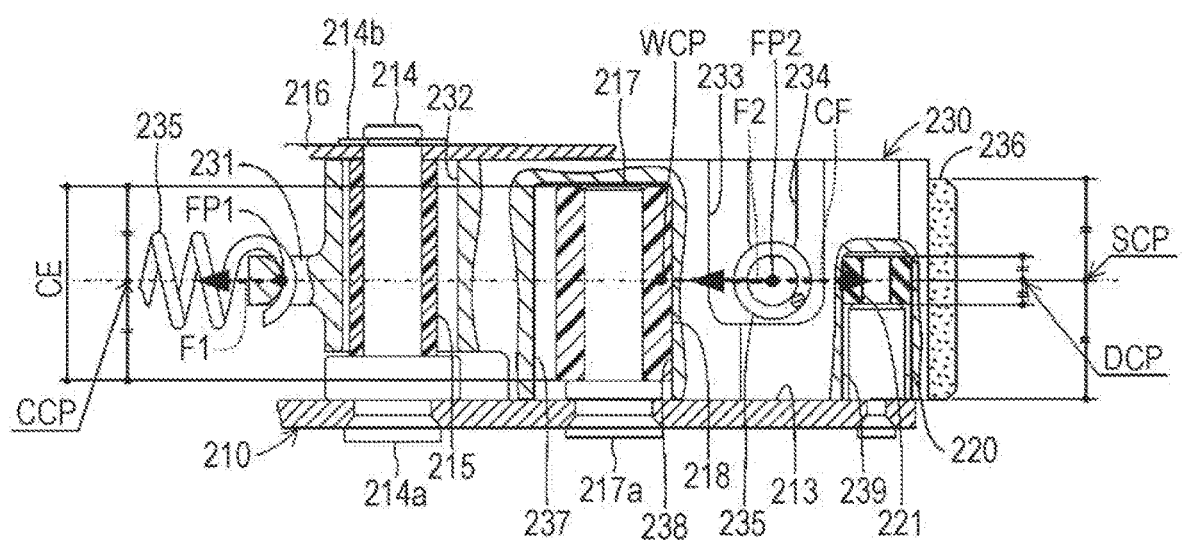
FIG. 10 is a partially-broken side view illustrating, from the point of view similar to that of FIG. 5, each of configurations of a clutch weight and a plate-side cam body in a centrifugal clutch according to a variation of the present invention.

Moreover, the centrifugal clutch 200 can be configured such that a center portion DCP in a contact area between the damper 221 and the damper groove 239 is coincident with the barycentric position WCP of the clutch weight 230. For example, the centrifugal clutch 200 can be, as illustrated in FIG. 10, configured such that in addition to the center portion CCP in the cam contact area CE between the plate-side cam body 218 and the weight-side cam body 238, the positions FP1, FP2 of action of the force F1, F2 of the coupling spring 235, and the center portion SCP of the clutch shoe 236 in the thickness direction thereof, the center portion DCP in the contact area between the damper 221 and the damper groove 239 is coincident with the barycentric position WCP of the clutch weight 230. According to this configuration, the centrifugal clutch 200 can more effectively reduce tilt of the clutch weight 230. Note that the center portion DCP is a midpoint at which a thickness direction of the damper 221 is divided in half. Note that the center portion DCP does not precisely mean only the midpoint, but includes the periphery of the midpoint which can be substantially taken as the midpoint.

Further, in the above-described embodiment, the centrifugal clutch 200 is configured such that each of the center portion CCP in the cam contact area CE between the plate-side cam body 218 and the weight-side cam body 238 and the positions FP1, FP2 of action of the force F1, F2 of the coupling spring 235 is coincident with the barycentric position WCP of the clutch weight 230. With this configuration, in the centrifugal clutch 200, the center portion CCP in the cam contact area CE between the plate-side cam body 218 and the weight-side cam body 238 and the positions FP1, FP2 of action of the force F1, F2 of the coupling spring 235 are, as a result, formed at the same position in the thickness direction. However, in the centrifugal clutch 200, the positions FP, FP2 of action of the force F1, F2 of the coupling spring 235 are positioned within the cam contact area CE between the plate-side cam body 218 and the weight-side cam body 238 so that tilt of the clutch weight 230 can be reduced.

Thus, in the centrifugal clutch 200, the positions FP1, FP2 of action of the force F1, F2 of the coupling spring 235 are arranged within the cam contact area CE between the plate-side cam body 218 and the weight-side cam body 238, and therefore, tilt of the clutch weight 230 can be reduced regardless of whether or not the center portion CCP in the cam contact area CE between the plate-side cam body 218 and the weight-side cam body 238 is coincident with the barycentric position WCP of the clutch weight 230.

Moreover, in the above-described embodiment, the centrifugal clutch 200 is configured such that the single plate-side cam body 218 is provided at the single cam body support pin 217. However, the centrifugal clutch 200 can be configured such that two or more plate-side cam bodies 218 are provided at the single cam body support pin 217. In this case, in the centrifugal clutch 200, an area between an end surface on a side closest to the side plate 216 and an end surface on a side closest to the drive plate 210 among the multiple plate-side cam bodies 218 can be taken as the cam contact area CE.

As in the plate-side cam body 218, in a case where two first spring attachment portions 231 and two second spring attachment portions 234 are provided in the thickness direction of the clutch weight 230 at the single clutch weight 230, the position FP1 of action of the resultant force F1 of the coupling springs 235, which are each attached to two first spring attachment portions 231, in the thickness direction of the clutch weight 230 and the position FP2 of action of the resultant force F2 of the coupling springs 235, which are each attached to two second spring attachment portions 234, in the thickness direction of the clutch weight 230 can be arranged coincident with the barycentric position WCP of the clutch weight 230, and/or can be arranged within the cam contact area CE.

Moreover, in the above-described embodiment, in the centrifugal clutch 200, the plate-side cam body 218 provided at the drive plate 210 includes the rotatable roller, and the weight-side cam body 238 formed at the clutch weight 230 includes the curved surface. That is, in the centrifugal clutch 200, each of the plate-side cam body 218 and the weight-side cam body 238 sliding on each other and forming a pair of cams includes the curved surface. However, it may be enough that the plate-side cam body 218 and the weight-side cam body 238 include the pair of cams sliding on each other. Thus, in the centrifugal clutch 200, at least one of the plate-side cam body 218 or the weight-side cam body 238 may be formed and configured in a linear planar shape.

Further, in the above-described embodiment, the plate-side cam body 218 includes the roller rotatable on the drive plate 210. However, it may be enough that the plate-side cam body 218 has a surface formed to project outward of an outer peripheral portion of the drive plate 210, having a shape pushing out the clutch weight 230 through the weight-side cam body 238, and extending in a rotary drive axis direction of the drive plate 210, i.e., a surface standing on a plate surface of the drive plate 210 and extending to a clutch weight 230 side.

That is, at least one of the plate-side cam body 218 or the weight-side cam body 238 may be formed to extend outward of the drive plate 210 toward the rear side in the rotary drive direction of the drive plate 210. Of the plate-side cam body 218 and the weight-side cam body 238, portions extending toward the rear side in the rotary drive direction of the drive plate 210 and extending outward of the drive plate 210 may be, in this case, formed across the entirety or part of the plate-side cam body 218 and the weight-side cam body 238. Thus, in the centrifugal clutch 200, the plate-side cam body 218 can be, for example, formed in a non-rotatable non-slidable fixed state on the drive plate 210.

The plate-side cam body 218 can be made of a material other than the resin material, such as a metal material (e.g., carbon steel, an iron-based sintered material, or an aluminum material). In this case, the plate-side cam body 218 can be made of the same material as that of the cam body support pin 217 or the weight-side cam body 238, or can be made of a material different from that of the cam body support pin 217 or the weight-side cam body 238. Alternatively, the plate-side cam body 218 is made of a more-easily-abradable material than the material(s) forming the cam body support pin 217 and/or the weight-side cam body 238, and therefore, abrasion of the cam body support pin 217 and/or the weight-side cam body 238 can be reduced. Alternatively, the plate-side cam body 218 is made of a material (e.g., an aluminum material) having better slidability than that of the material(s) forming the cam body support pin 217 and/or the weight-side cam body 238, and therefore, the slidability between the cam body support pin 217 and the weight-side cam body 238 can be improved. Alternatively, the plate-side cam body 218 can be also made of a material (e.g., a metal material or a ceramic material) having thermal resistance and abrasion resistance.

Further, in the above-described embodiment, the centrifugal clutch 200 is configured such that the swing support pins 214 are provided at the drive plate 210 and the pin slide holes 232 are provided at the clutch weights 230. However, one of the swing support pin 214 or the pin slide hole 232 may be provided at the drive plate 210 or the clutch weight 230, and the other one of the swing support pin 214 or the pin slide hole 232 may be provided at the clutch weight 230 or the drive plate 210. Thus, the centrifugal clutch 200 can be also configured such that the swing support pins 214 are provided at the clutch weights 230 and the pin slide holes 232 are provided at the drive plate 210.

Moreover, in the above-described embodiment, the pin slide hole 232 is formed as the arc-shaped through-hole. However, it is enough to form the pin slide hole 232 as the long hole allowing backward displacement of the clutch weight 230 in the rotary drive direction of the drive plate 210 in a state (see FIG. 7) in which the clutch shoe 236 of the clutch weight 230 is most separated from the cylindrical surface 241 of the clutch outer 240. Thus, the pin slide hole 232 is not limited to that of the above-described embodiment.

Thus, the pin slide hole 232 can be formed in a linear shape extending in a tangential direction perpendicular to the radial direction of the drive plate 210. Alternatively, the pin slide hole 232 can be also formed as a so-called blind hole opening on one side and closed on the other side.

Moreover, in the above-described embodiment, the pivot-point-side slide member 215 is formed in the cylindrical shape from the resin material, and is rotatably slidably provided at the outer peripheral portion of the swing support pin 214. In other words, the pivot-point-side slide member 215 is configured to function as a roller for the swing support pin 214. However, it is enough to provide the pivot-point-side slide member 215 between the swing support pin 214 and the pin slide hole 232 to slidably displace these components.

Thus, the pivot-point-side slide member 215 can be made of other materials than the resin material, such as a metal material. In this case, the pivot-point-side slide member 215 may be made of the same material as that of the swing support pin 214 or the pin slide hole 232, or may be made of a material different from that of the swing support pin 214 or the pin slide hole 232. In this case, the pivot-point-side slide member 215 is made of a more-easily-abradable material than the material(s) forming the swing support pin 214 and/or the pin slide hole 232, and therefore, abrasion of the swing support pin 214 and/or the pin slide hole 232 can be reduced. Alternatively, the pivot-point-side slide member 215 is made of a material (e.g., an aluminum material) having better slidability than that of the material(s) forming the swing support pin 214 and/or the pin slide hole 232, and therefore, the slidability between the swing support pin 214 and the pin slide hole 232 can be improved. Alternatively, the pivot-point-side slide member 215 can be also made of a material (e.g., a metal material or a ceramic material) having thermal resistance and abrasion resistance.

Further, the pivot-point-side slide member 215 can be provided in a non-rotatable non-slidable fixed state at the outer peripheral portion of the swing support pin 214. In this case, the pivot-point-side slide member 215 may be formed in a tubular shape fitted onto the swing support pin 214. Alternatively, a cutout portion can be formed at the swing support pin 214, and the pivot-point-side slide member 215 can be formed in a plate shape fitted in such a cutout portion and extending in a planar shape or an arc shape. In addition, the pivot-point-side slide member 215 can be also formed by resin material insert molding for the cutout portion formed at the swing support pin 214. Moreover, one of the swing support pin 214 itself or the pin slide hole 232 itself can be also made of a resin material. Note that the pivot-point-side slide member 215 is rotatably slidably formed at the outer peripheral portion of the swing support pin 214 so that the pivot-point-side slide member 215 can be easily assembled with the swing support pin 214 and slide resistance can be reduced.

Moreover, the pivot-point-side slide member 215 can be also provided at the pin slide hole 232 in addition to or instead of the swing support pin 214. Further, the centrifugal clutch 200 can be also configured such that the pivot-point-side slide member 215 is omitted and the swing support pin 214 and the pin slide hole 232 are directly fitted to each other upon sliding.

LIST OF REFERENCE SIGNS

WCP Barycentric position of clutch weight
CE Contact area between plate-side cam body and weight-side cam body
CCP Center portion in cam contact area CE between plate-side cam body and weight-side cam body
F1, F2 Force of coupling spring acting on clutch weight
FP1 Position of action of force F1 in thickness direction of clutch weight
FP2 Position of action of force F2 in thickness direction of clutch weight
SCP Center portion of clutch shoe in thickness direction
DCP Center portion of damper in thickness direction
CF Resultant force on assumption that centrifugal force acting on entirety of clutch weight acts on single point
100 Power transmission mechanism
101 Transmission
110 Drive pulley
111 Crankshaft
112 Stationary drive plate
112a Radiation fin
113 Movable drive plate
114 Sleeve bearing
115 Roller weight
116 Lamp plate
120 V-belt
130 Driven pulley
131 Stationary driven plate
132 Driven sleeve
133 Drive shaft
134 Movable driven plate
135 Torque spring
200 Centrifugal clutch
210 Drive plate
211 Bottom portion
211a Through-hole
212 Tube portion
213 Flange portion
214 Swing support pin
214a Attachment bolt
214b E-ring
215 Pivot-point-side slide member 216 Side plate
217 Cam body support pin
217a Attachment bolt
218 Plate-side cam body
220 Damper receiving pin
221 Damper
230 Clutch weight
231 First spring attachment portion
232 Pin slide hole
233 Spring housing portion
234 Second spring attachment portion
235 Coupling spring
236 Clutch shoe
237 Plate-side cam body relief
238 Weight-side cam body
239 Damper groove
240 Clutch outer
241 Cylindrical surface

The invention claimed is:

1. A centrifugal clutch comprising:
a drive plate to be rotatably driven together with a driven pulley in response to drive force of an engine;
a clutch outer having, outside the drive plate, a cylindrical surface provided concentrically with the drive plate;
multiple clutch weights having clutch shoes formed to extend along a circumferential direction of the drive plate and facing the cylindrical surface of the clutch outer, one end side of each clutch weight in the circumferential direction being turnably attached onto the drive plate through a swing support pin and a pin slide hole and the other end side displacing toward a cylindrical surface side of the clutch outer;
a plate-side cam body having, on the drive plate, a surface extending in a rotary drive axis direction of the drive plate;
a weight-side cam body provided at the each clutch weight and configured to slide and climb on the plate-side cam body upon displacement of the other end side of the each clutch weight; and
a coupling spring attached to the each clutch weight and causing force in a direction in which the each clutch weight separates from the clutch outer to act on the other end side of the each clutch weight,
wherein at least one of a center portion of a portion, at which the plate-side cam body and the weight-side cam body contact each other, in a thickness direction or a position of action of force of the coupling spring in a thickness direction of the each clutch weight is formed coincident with a barycentric position of the each clutch weight.

2. The centrifugal clutch according to claim 1, wherein the position of action of the force of the coupling spring in the thickness direction of the each clutch weight is formed at a position within a cam contact area between one end portion and the other end portion of the portion at which the plate-side cam body and the weight-side cam body contact each other in the thickness direction of the each clutch weight.

3. The centrifugal clutch according to claim 1, wherein each of the center portion of the portion, at which the plate-side cam body and the weight-side cam body contact each other, in the thickness direction and the position of action of the force of the coupling spring in the thickness direction of the each clutch weight is formed coincident with the barycentric position of the each clutch weight.

4. The centrifugal clutch according to claim 1, wherein a center portion of the clutch shoe in a thickness direction thereof is formed coincident with the barycentric position of the each clutch weight.

5. The centrifugal clutch according to claim 1, further comprising:
a damper provided on the drive plate to face the each clutch weight and including an elastic body; and
a damper groove formed in a groove shape at the each clutch weight, extending along a turning displacement direction in which the each clutch weight approaches or separates from the clutch outer, and configured such that the damper is fitted in the damper groove with the damper being slidably sandwiched by the damper groove,
wherein a center portion of a portion, at which the damper and the damper groove contact each other, in the thickness direction is formed coincident with the barycentric position of the each clutch weight.

6. The centrifugal clutch according to claim 1, wherein the swing support pin is provided at one of the drive plate or the clutch weight, and is formed to extend toward the other one of the drive plate or the clutch weight, and
the pin slide hole is provided at the other one of the drive plate or the clutch weight and is formed in a long hole shape allowing backward displacement of the one end side of the each clutch weight in a rotary drive direction of the drive plate, and the swing support pin is slidably displaceably fitted in the pin slide hole.

* * * * *